United States Patent
Chang et al.

(10) Patent No.: US 10,804,595 B2
(45) Date of Patent: Oct. 13, 2020

(54) ANTENNA STRUCTURE AND WIRELESS COMMUNICATION DEVICE USING SAME

(71) Applicant: Chiun Mai Communication Systems, Inc., New Taipei (TW)

(72) Inventors: Cheng-I Chang, New Taipei (TW); Yu-Ting Chen, New Taipei (TW); Chien-Chang Liu, New Taipei (TW); Dan-Yu Chen, New Taipei (TW); Po-Chih Lin, New Taipei (TW); Chuan-Chou Chi, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 245 days.

(21) Appl. No.: 15/834,068

(22) Filed: Dec. 7, 2017

(65) Prior Publication Data
US 2018/0166769 A1 Jun. 14, 2018

(30) Foreign Application Priority Data
Dec. 9, 2016 (CN) .......................... 2016 1 1128416

(51) Int. Cl.
*H01Q 1/24* (2006.01)
*H01Q 1/30* (2006.01)
*H01Q 5/335* (2015.01)
*H01Q 5/364* (2015.01)

(52) U.S. Cl.
CPC ............ *H01Q 1/243* (2013.01); *H01Q 5/335* (2015.01); *H01Q 5/364* (2015.01)

(58) Field of Classification Search
CPC .......... H01Q 1/24; H01Q 1/241; H01Q 1/242; H01Q 1/243; H01Q 5/307; H01Q 5/314; H01Q 5/328; H01Q 5/335; H01Q 5/35; H01Q 5/357; H01Q 5/364; H01Q 5/371; H01Q 5/50
See application file for complete search history.

(56) References Cited

U.S. PATENT DOCUMENTS

| | | | |
|---|---|---|---|
| 9,509,042 B1 | 11/2016 | Zheng et al. | |
| 9,762,710 B2 * | 9/2017 | Lee | H01Q 1/243 |
| 9,941,588 B2 * | 4/2018 | Desclos | H01Q 5/328 |
| 10,177,443 B2 * | 1/2019 | Xue | H01Q 5/314 |
| 10,283,870 B2 * | 5/2019 | Nishizono | H01Q 9/32 |

* cited by examiner

*Primary Examiner* — Daniel Munoz
*Assistant Examiner* — Patrick R Holecek
(74) *Attorney, Agent, or Firm* — ScienBiziP, P.C.

(57) ABSTRACT

An antenna structure includes a metallic member, a feed portion, and a coupling resistor. The metallic member defines a slot, a first gap, a second gap, and a third gap. The first gap and the second gap are connected with the slot and divide with the slot the metallic member into a first portion and a second portion. The second portion is grounded. The third gap is defined on the first portion and connected with the slot. The first portion is divided into a radiating portion and a coupling portion by the third gap. The coupling portion is spaced apart from the radiating portion. The feed portion is electrically connected to the radiating portion, and the coupling portion is grounded through the coupling resistor.

19 Claims, 8 Drawing Sheets

ANTENNA STRUCTURE AND WIRELESS COMMUNICATION DEVICE USING SAME

CROSS-REFERENCE TO RELATED APPLICATIONS

This application claims priority to Chinese Patent Application No. 201611128416.7 filed on Dec. 9, 2016, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones and personal digital assistants (PDAs). Antennas are also important components in wireless communication devices for receiving and transmitting wireless signals at different frequencies, such as signals in Long Term Evolution Advanced (LTE-A) frequency bands. However, when the antenna is located in the metal housing, the metal housing shields and restricts the antenna signals. This can degrade the operation of the wireless communication device.

BRIEF DESCRIPTION OF THE DRAWINGS

Implementations of the present disclosure will now be described, by way of example only, with reference to the attached figures.

DETAILED DESCRIPTION

Figure 1:
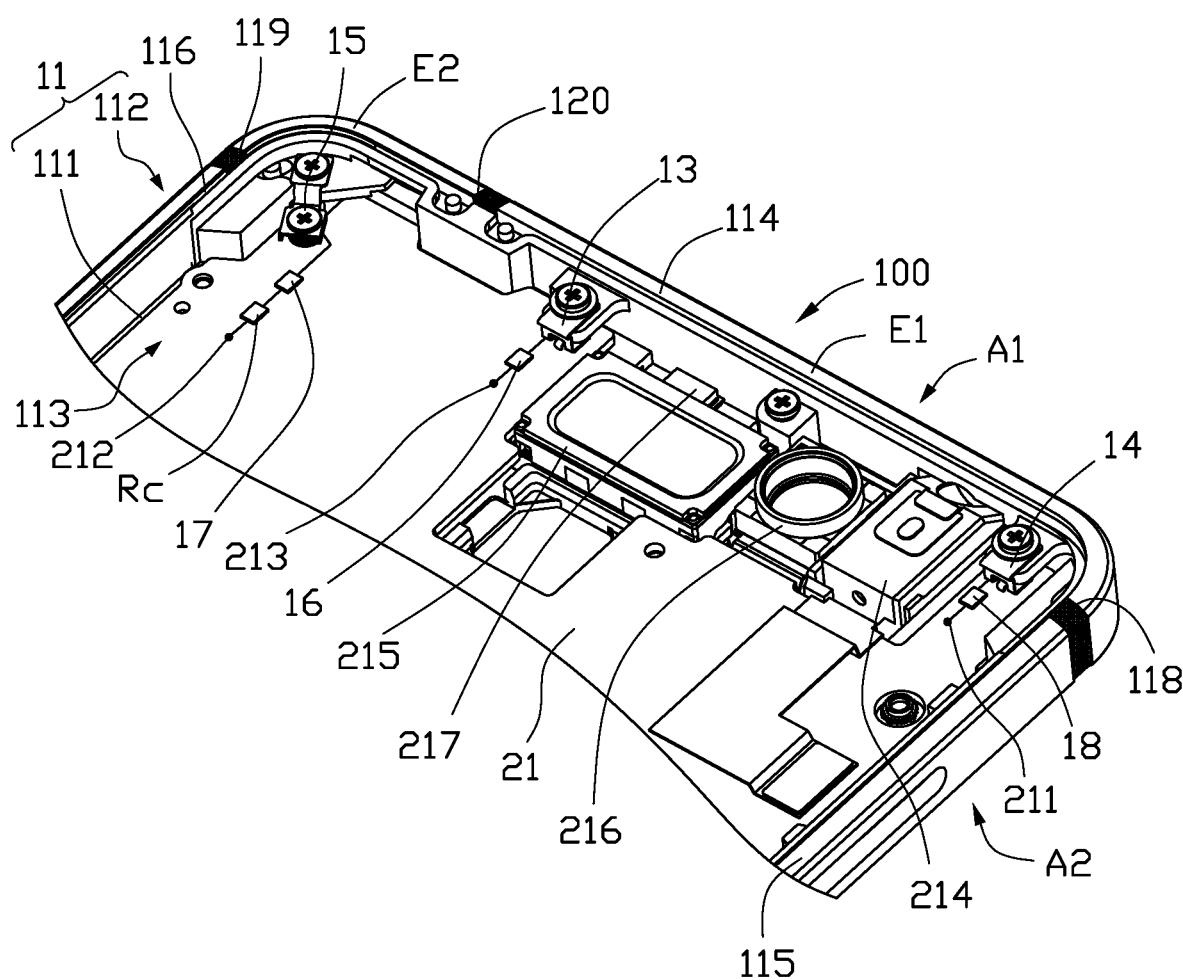
FIG. 1 is an isometric view of an exemplary embodiment of a portion of a wireless communication device using an exemplary antenna structure in accordance with the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

FIG. 1 illustrates an exemplary embodiment of a wireless communication device 200 using an antenna structure 100. The wireless communication device 200 can be a mobile phone or a personal digital assistant, for example. The antenna structure 100 can receive and transmit wireless signals.

The wireless communication device 200 further includes a substrate 21. The substrate 21 can be made of dielectric material, such as epoxy resin glass fiber (FR4). The substrate 21 includes a first ground point 211, a second ground point 212, and a feed point 213. The first ground point 211 and the second ground point 212 are on the substrate 21 and spaced apart from each other. The first ground point 211 and the second ground point 212 both ground the antenna structure 100. The feed point 213 is positioned between the first ground point 211 and the second ground point 212. The feed point 213 supplies current to the antenna structure 100.

The substrate 21 further includes at least one electronic element. In this exemplary embodiment, the substrate 21 includes four electronic elements. The four electronic elements include a first electronic element 214, a second electronic element 215, a third electronic element 216, and a fourth electronic element 217. The first electronic element 214, the second electronic element 215, the third electronic element 216, and the fourth electronic element 217 are all positioned at a same side of the substrate 21 and between the first ground point 211 and the feed point 213.

In this exemplary embodiment, the first electronic element 214 is an audio interface module, such as an earphone interface module. The first electronic element 214 is positioned adjacent to the first ground point 211. The second electronic element 215 is an audio receiver and speaker module. The second electronic element 215 is positioned adjacent to the feed point 213. The third electronic element 216 is a front camera module. The third electronic element 216 is positioned between the first electronic element 214 and the second electronic element 215. The fourth electronic element 217 is a microphone module. The fourth electronic element 217 is positioned adjacent to the feed point 213 and the second electronic element 215.

Figure 2:
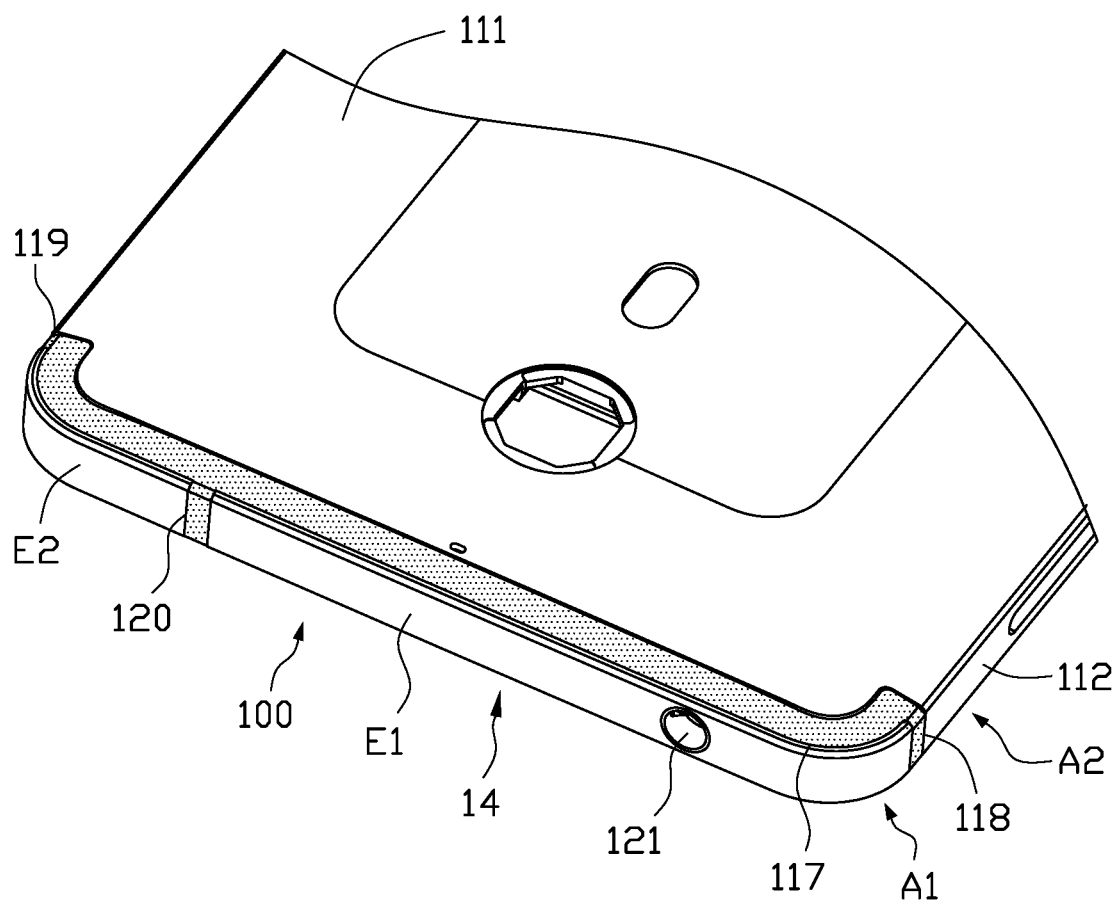
FIG. 2 is similar to FIG. 1, but shown from another angle.
Figure 3:
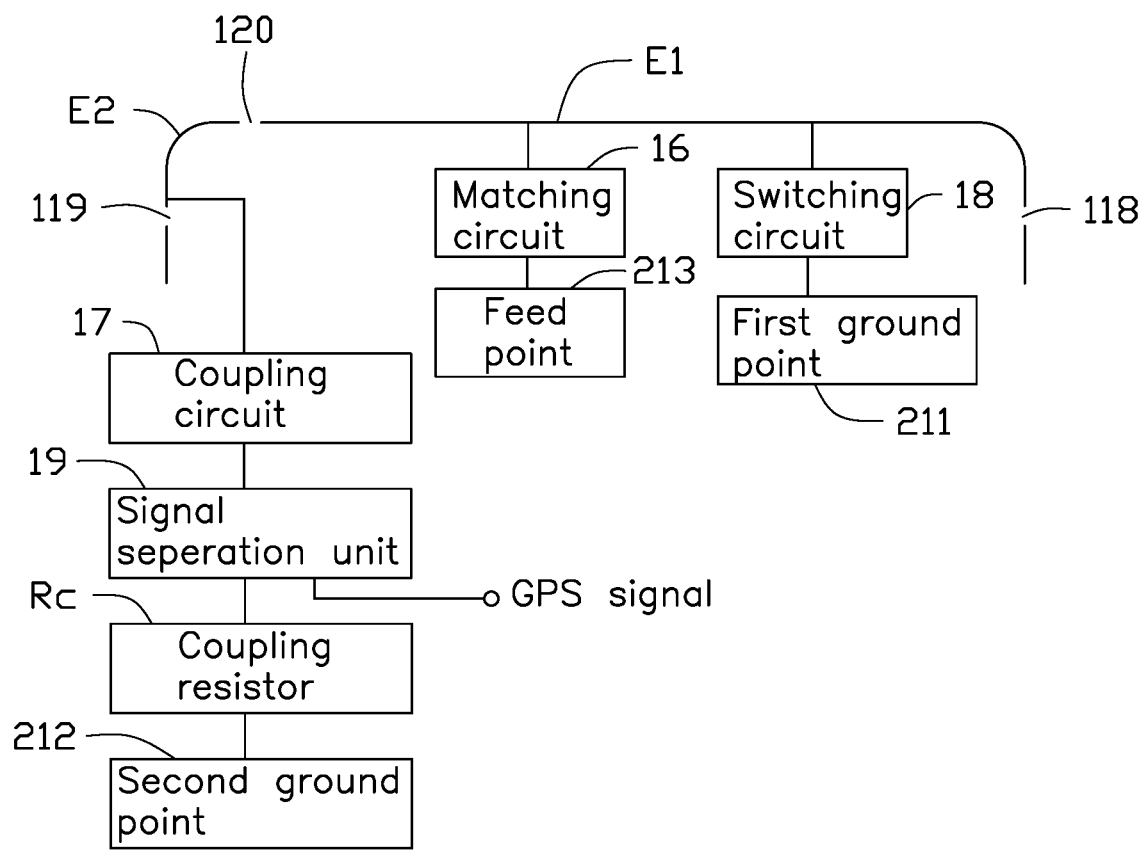
FIG. 3 is a circuit diagram of the antenna structure of FIG. 1.

As illustrated in FIG. 2 and FIG. 3, the antenna structure 100 includes a metallic member 11, a feed portion 13, a first ground portion 14, a second ground portion 15, a matching circuit 16, and a coupling resistor Rc. The metallic member 11 can be a metallic housing of the wireless communication device 200. In this exemplary embodiment, the metallic member 11 includes a backboard 111 and a side frame 112. The backboard 111 and the side frame 112 can be integral with each other. The side frame 112 surrounds a periphery of the backboard 111. The side frame 112 forms a receiving space 113 together with the backboard 111. The receiving space 113 can receive the substrate 21, a processing unit, or other electronic components or modules (not shown).

In this exemplary embodiment, the side frame 112 includes an end portion 114, a first side portion 115, and a second side portion 116. The first side portion 115 is spaced apart from and parallel to the second side portion 116. The end portion 114 has first and second ends. The first side portion 115 is connected to the first end of the end portion 114 and the second side portion 116 is connected to the second end of the end portion 114. In this exemplary embodiment, the end portion 114 can be a top portion or a bottom portion of the wireless communication device 200.

The metallic member 11 further defines a slot 117, a first gap 118, a second gap 119, and a third gap 120. In this exemplary embodiment, the slot 117 is substantially U-shaped. The slot 117 is defined on the backboard 111 adjacent to the end portion 114. The first gap 118, the second gap 119, and the third gap 120 are all defined on the side frame 112. The first gap 118 is defined on the first side portion 115. The second gap 119 is defined on the second side portion 116. The first gap 118 and the second gap 119 are connected with the slot 117 and extend to interrupt the side frame 112. The metallic member 11 is divided into two portions by the slot 117, the first gap 118, and the second gap 119. The two portions are a first portion A1 and a second portion A2.

In other exemplary embodiments, a shape of the slot 117 is not limited to being U-shaped and can be, for example, a straight strip, an oblique line, or a meander.

In this exemplary embodiment, the slot 117 is defined on the backboard 111 adjacent to the end portion 114 and extends to an edge of the end portion 114. The first portion A1 is completely formed by the end portion 114, a portion of the first side portion 115, and a portion of the second side portion 116, that is, the first portion A1 is formed by a portion of the side frame 112. In other exemplary embodiments, a position of the slot 117 can be adjusted. For example, the slot 117 can be defined on a middle portion of the backboard 111. The first portion A1 is formed by a portion of the side frame 112 and a portion of the backboard 111.

In other exemplary embodiments, a location of the slot 117 is not limited to being on the backboard 111. For example, the slot 117 can be defined on the end portion 114.

In other exemplary embodiments, locations of the first gap 118 and the second gap 119 can be adjustable. For example, the first gap 118 and the second gap 119 are both defined on the end portion 114. For example, one of the first gap 118 and the second gap 119 is defined on the end portion 114 while the other one of the first gap 118 and the second gap 119 is defined on one of the first side portion 115 and the second side portion 116. That is, a shape and a location of the slot 117, locations of the first gap 118, and the second gap 119 on the side frame 112 can be adjusted, to ensure that the metallic member 11 can be divided into the first portion A1 and the second portion A2 by the slot 117, the first gap 118, and the second gap 119.

In this exemplary embodiment, the third gap 120 is defined on the first portion A1. The third gap 120 is positioned between the first gap 118 and the second gap 119. The third gap 120 is connected with the slot 117 and extends to interrupt the first portion A1. In this exemplary embodiment, the third gap 120 is positioned adjacent to the second side portion 116. The first portion A1 is divided into two portions by the third gap 120. The two portions are a radiating portion E1 and a coupling portion E2. A first portion of the side frame 112 between the third gap 120 and the first gap 118 forms the radiating portion E1. A second portion of the side frame 112 between the third gap 120 and the second gap 119 forms the coupling portion E2.

In this exemplary embodiment, the third gap 120 is not positioned at a middle portion of the end portion 114. The radiating portion E1 is longer than the coupling portion E2. In this exemplary embodiment, the slot 117, the first gap 118, the second gap 119, and the third gap 120 are all filled with insulating material, for example, plastic, rubber, glass, wood, ceramic, or the like. The radiating portion E1, the coupling portion E2, and other parts of the metallic member 11 are each thereby isolated.

In this exemplary embodiment, the radiating portion E1 further defines a through hole 121. The through hole 121 corresponds to the first electronic element 214 and the first electronic element 214 is partially exposed from the through hole 121. An audio module, for example an earphone, can thus be inserted in the through hole 121 and be electrically connected to the first electronic element 214.

As illustrated in FIG. 1 and FIG. 3, one end of the feed portion 13 is electrically connected to one end of the radiating portion E1 adjacent to the third gap 120. Another end of the feed portion 13 is electrically connected to the feed point 213 through the matching circuit 16, to supply current to the radiating portion E1.

Figure 4:
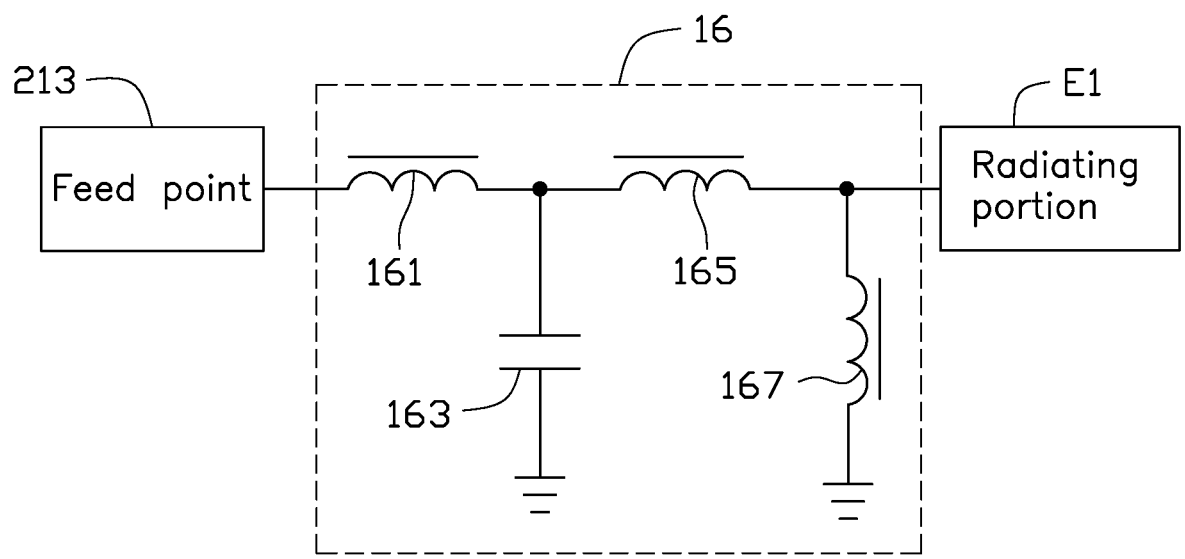
FIG. 4 is a circuit diagram of a matching circuit of the antenna structure of FIG. 1.

As illustrated in FIG. 4, in this exemplary embodiment, the matching circuit 16 includes a first matching element 161, a second matching element 163, a third matching element 165, and a fourth matching element 167. One end of the first matching element 161 is electrically connected to the feed point 213. Another end of the first matching element 161 is electrically connected to one end of the second matching element 163 and one end of the third matching element 165. Another end of the second matching element 163 is grounded. Another end of the third matching element 165 is electrically connected to one end of the fourth matching element 167 and is also electrically connected to the radiating portion E1 through the feed portion 13. Another end of the fourth matching element 167 is grounded.

In this exemplary embodiment, the first matching element 161, the third matching element 165, and the fourth matching element 167 are inductors and have respective inductance values of about 2.7 nH, 1.6 nH, and 3.9 nH. The second matching element 163 is a capacitor having a capacitance value of about 2 pF. In other exemplary embodiments, the first matching element 161, the third matching element 165, and the fourth matching element 167 are not limited to being inductors and can be capacitors or a combination of inductor and capacitor. The second matching element 163 is not limited to being capacitor and can be an inductor or a combination of inductor and capacitor.

One end of the first ground portion 14 is electrically connected to one end of the radiating portion E1 adjacent to the first gap 118. Another end of the first ground portion 14 is grounded. One end of the second ground portion 15 is electrically connected to the coupling portion E2. Another end of the second ground portion 15 is electrically grounded to the second ground point 212 through the coupling resistor Rc. In this exemplary embodiment, the coupling resistor Rc has a resistance value of about 50 ohm.

When the feed point 213 supplies current, the current flows to the feed portion 13 through the matching circuit 16 and flows through the radiating portion E1. One portion of the current flows to the first ground portion 14 through the radiating portion E1, thereby the radiating portion E1 is activated in a first operation mode to generate radiation signals in a first frequency band. In this exemplary embodiment, the first mode is a low frequency operation mode.

The current flowing through the radiating portion E1 is further coupled to the coupling portion E2 through the third gap 120, and is grounded through the second ground portion 15 and the coupling resistor Rc. Then the coupling portion E2 is activated in a second operation mode to generate radiation signals in a second frequency band. In this exemplary embodiment, the second mode is a middle and high frequency operation mode. A frequency of the first frequency band is lower than a frequency of the second frequency band.

In this exemplary embodiment, the coupling resistor Rc ensures that the currents of different frequencies are all grounded through the coupling resistor Rc to obtain a flat coupling amount. Then the antenna structure 100 has an enhanced effectiveness in the high frequency band and keeps a wide high frequency bandwidth.

As illustrated in FIG. 1 and FIG. 3, in other exemplary embodiments, the antenna structure 100 further includes a coupling circuit 17. One end of the coupling circuit 17 is electrically connected to the second ground portion 15. Another end of the coupling circuit 17 is grounded through the coupling resistor Rc and the second ground point 212.

Figure 5:
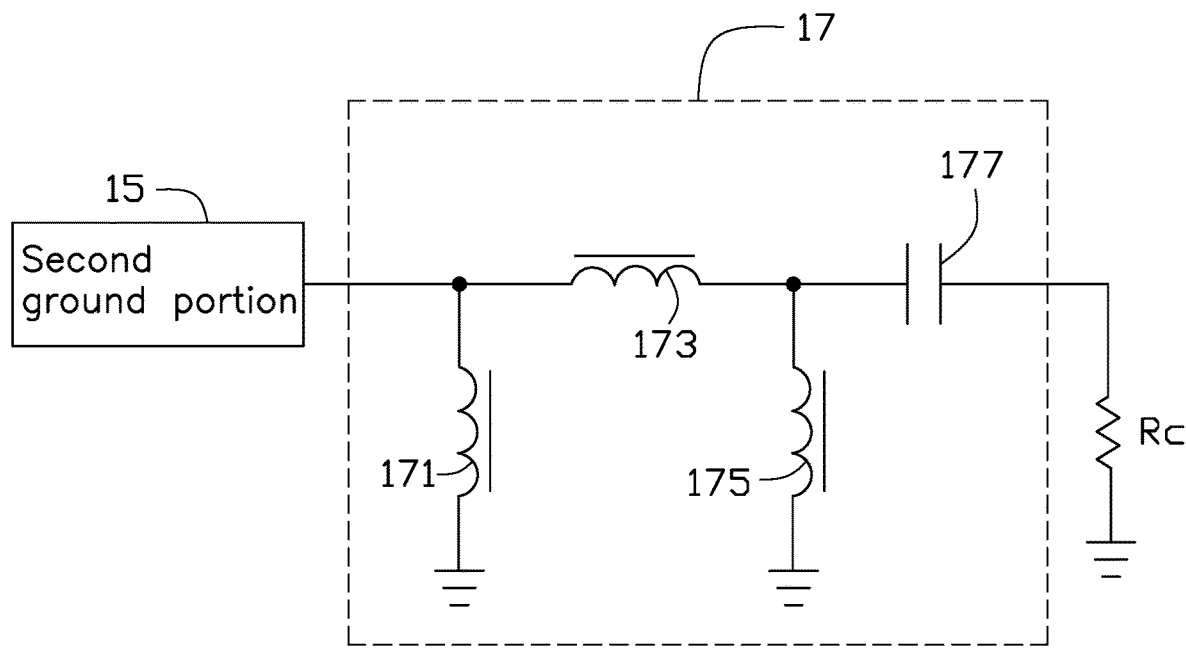
FIG. 5 is a circuit diagram of a coupling circuit of the antenna structure of FIG. 1.

As illustrated in FIG. 5, the coupling circuit 17 includes a first coupling element 171, a second coupling element 173, a third coupling element 175, and a fourth coupling element 177.

One end of the first coupling element 171 is electrically connected to the second ground portion 15 and to one end of the second coupling element 173. Another end of the first coupling element 171 is grounded. Another end of the second coupling element 173 is electrically connected to one end of the third coupling element 175 and to one end of the fourth coupling element 177. Another end of the third coupling element 175 is grounded. Another end of the fourth coupling element 177 is grounded through the coupling resistor Rc and the second ground point 212.

In this exemplary embodiment, the first coupling element 171, the second coupling element 173, and the third coupling element 175 are inductors and have respective inductance values of about 5.6 nH, 1 nH, and 3.6 nH. The fourth coupling element 177 is a capacitor having a capacitance value of about 1.8 pF. In other exemplary embodiments, the first coupling element 171, the second coupling element 173, and the third coupling element 175 are not limited to being inductors and can be capacitors or a combination of inductor and capacitor. The fourth coupling element 177 is not limited to being capacitor and can be an inductor or a combination of inductor and capacitor.

In this exemplary embodiment, the second portion A2 is grounded and acts as a ground of the antenna structure 100. One end of the coupling portion E2 adjacent to the second gap 119 can be electrically connected to the second portion A2 through a connecting structure. That is, the second gap 119 positioned at one end of the second side portion 116 is a virtual gap. Although the coupling portion E2 is spaced apart from the backboard 111 through the second gap 119, the coupling portion E2 and the backboard 111 actually have an electrical connection through the connection structure.

As illustrated in FIG. 1 and FIG. 3, in other exemplary embodiments, the antenna structure 100 further includes a switching circuit 18 for adjusting the first frequency band, that is, the antenna structure 100 has a good low frequency bandwidth. In this exemplary embodiment, one end of the first ground portion 14 is electrically connected to the radiating portion E1. Another end of the first ground portion 14 is electrically connected to the first ground point 211 through the switching circuit 18.

Figure 6:
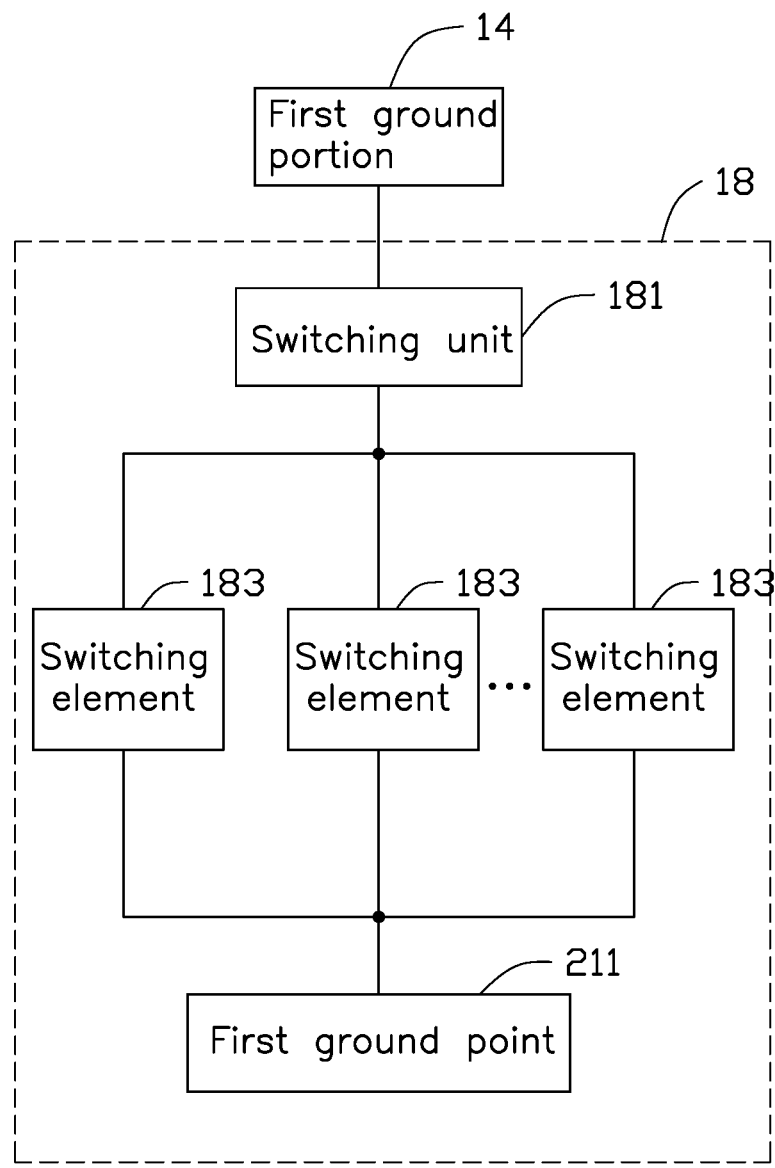
FIG. 6 is a circuit diagram of a switching circuit of the antenna structure of FIG. 1.

As illustrated in FIG. 6, in this exemplary embodiment, the switching circuit 18 includes a switching unit 181 and a plurality of switching elements 183. The switching unit 181 is electrically connected to the first ground portion 14. The switching elements 183 can be an inductor, a capacitor, or a combination of inductor and capacitor. The switching elements 183 are connected in parallel. One end of each switching element 183 is electrically connected to the switching unit 181. The other end of each switching element 183 is electrically connected to the first ground point 211.

Through controlling the switching unit 181, the radiating portion E1 can be switched to connect with different switching elements 183. Since each switching element 183 has a different resistance value, frequencies of the first mode of the radiating portion E1 can be adjusted through the switching of the switching unit 181.

As illustrated in FIG. 3, the antenna structure 100 further includes a signal separation unit 19. The signal separation unit 19 is electrically connected between the coupling circuit 17 and the coupling resistor Rc. When the current from the feed point 213 is coupled to the coupling portion E2 through the third gap 120, radiation signals of the second frequency band will enter the signal separation unit 19 through the coupling circuit 17. The signal separation unit 19 then separates a GPS signal from the current, and other radiation signals are grounded through the coupling resistor Rc.

As described above, the radiating portion E1 is activated in the first operation mode to generate radiation signals in a low frequency band. The coupling portion E2 is activated in the second operation mode to generate radiation signals in a middle and high frequency band. The wireless communication device 200 can use carrier aggregation (CA) technology of LTE-A to receive or transmit wireless signals at multiple frequency bands simultaneously. In detail, the wireless communication device 200 can use the CA technology and use the first portion A1 to receive or transmit wireless signals at multiple frequency bands simultaneously, that is, the wireless communication device 200 can realize 2CA or 3CA operation simultaneously.

Figure 7:
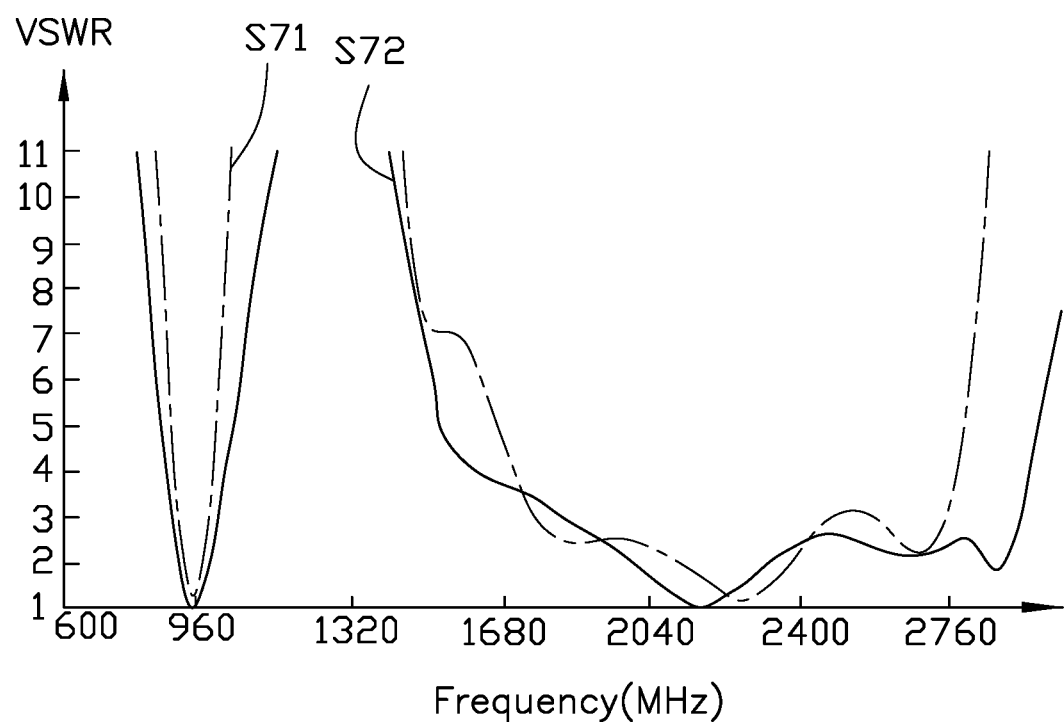
FIG. 7 is a voltage standing wave ratio (VSWR) graph of the antenna structure of FIG. 1.

FIG. 7 illustrates a voltage standing wave ratio (VSWR) graph of the antenna structure 100. Curve S71 illustrates a VSWR of the antenna structure 100 obtained by a simulation test. Curve S72 illustrates a VSWR of the antenna structure 100 obtained by an actual test.

Figure 8:
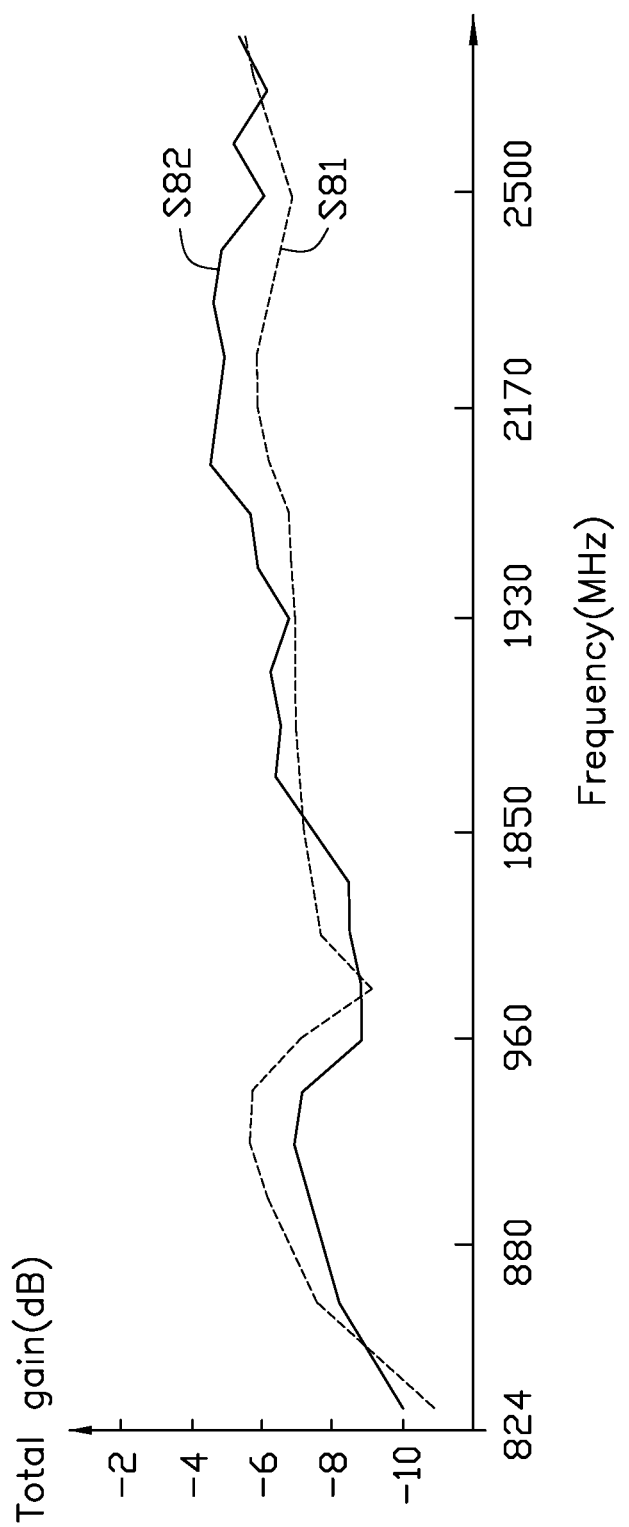
FIG. 8 is a total gain graph of the antenna structure of FIG. 1.

FIG. 8 illustrates a graph of the total gain of the antenna structure 100. Curve S81 illustrates a total gain of the antenna structure 100 obtained by a simulation test. Curve S82 illustrates a total gain of the antenna structure 100 obtained by an actual test. As shown in FIG. 7 and FIG. 8, the antenna structure 100 may operate at a low frequency band and have a preferred high frequency bandwidth, i.e., the antenna structure 100 can operate at a frequency band of about 1710-2690 MHz.

The antenna structure 100 includes the metallic member 11. The metallic member 11 is divided into the radiating portion E1 and the coupling portion E2 by the slot 117, the first gap 118, the second gap 119, and the third gap 120. The coupling portion E2 is grounded through the coupling resistor Rc. The antenna structure 100 is not constrained by a keep-out-zone and a ground distance, effectively realizes a broadband design, and maintains a high frequency effectiveness.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a metallic member defining a slot, a first gap, a second gap, and a third gap; wherein the first gap and the second gap are connected with the slot and divide with the slot the metallic member into a first portion and a second portion; wherein the second portion is grounded; and wherein the third gap is defined on the first portion, is connected with the slot, and divides the first portion into a radiating portion and a coupling portion spaced apart from the radiating portion;
a feed portion electrically connected to the radiating portion;
a coupling resistor through which the coupling portion is grounded; and
a signal separation unit electrically connected between the coupling portion and the coupling resistor;
wherein the metallic member comprises a backboard and a side frame, the slot is defined on the backboard or the side frame, the backboard is a rear cover or a battery cover of a wireless communication device;
wherein when the feed portion supplies current, the current flows to the radiating portion and activates a first operation mode to generate radiation signals in a first frequency band;
wherein the current flowing through the radiating portion is further coupled to the coupling portion through the third gap and activates a second operation mode to generate radiation signals in a second frequency band;
wherein when the current flowing through the radiating portion is coupled to the coupling portion through the third gap, radiation signals of the second frequency band enters the signal separation unit, the signal separation unit then separates a GPS signal from the current, and other radiation signals are grounded through the coupling resistor; and
wherein the coupling resistor grounds currents of different frequencies thereby a flat coupling amount is maintained.

2. The antenna structure of claim 1, wherein the slot, the first gap, the second gap, and the third gap are all filled with insulating material.

3. The antenna structure of claim 1, wherein the side frame is positioned around a periphery of the backboard, and wherein the first gap, the second gap, and the third gap are defined on the side frame.

4. The antenna structure of claim 3, wherein a first portion of the side frame between the third gap and the first gap forms the radiating portion, and a second portion of the side frame between the third gap and the second gap forms the coupling portion; wherein a frequency of the first frequency band is lower than a frequency of the second frequency band.

5. The antenna structure of claim 1, further comprising a matching circuit, wherein the matching circuit comprises a first matching element, a second matching element, a third matching element, and a fourth matching element; and wherein one end of the first matching element feeds the current, another end of the first matching element is electrically connected to one end of the second matching element and one end of the third matching element, another end of the second matching element is grounded, another end of the third matching element is electrically connected to one end of the fourth matching element and the radiating portion, and another end of the fourth matching element is grounded.

6. The antenna structure of claim 1, further comprising a coupling circuit, wherein the coupling circuit is electrically connected between the coupling portion and the signal separation unit, the coupling circuit comprises a first coupling element, a second coupling element, a third coupling element, and a fourth coupling element; and wherein one end of the first coupling element is electrically connected to the coupling portion and one end of the second coupling element, another end of the first coupling element is grounded, another end of the second coupling element is electrically connected to one end of the third coupling element and one end of the fourth coupling element, another end of the third coupling element is grounded, and another end of the fourth coupling element is electrically connected to the signal separation unit.

7. The antenna structure of claim 4, further comprising a switching circuit, wherein the switching circuit comprises a switching unit and a plurality of switching elements; wherein the switching unit is electrically connected to the radiating portion, the switching elements are connected in parallel to each other, one end of each switching element is electrically connected to the switching unit, and the other end of each switching element is grounded; and wherein through controlling the switching unit to switch, the radiating portion is switched to different switching elements and the first frequency band is adjusted.

8. The antenna structure of claim 1, wherein the first portion is configured to be used by a wireless communication device to receive or transmit wireless signals at multiple frequency bands simultaneously through carrier aggregation (CA) technology of Long Term Evolution Advanced (LTE-A).

9. The antenna structure of claim 8, wherein the radiating portion and the coupling portion are configured to be used by the wireless communication device to receive or transmit wireless signals at multiple frequency bands simultaneously through the CA technology of LTE-A.

10. A wireless communication device comprising:
an antenna structure comprising:
a metallic member defining a slot, a first gap, a second gap, and a third gap; wherein the first gap and the second gap are connected with the slot and divide with the slot the metallic member into a first portion and a second portion; wherein the second portion is grounded; and wherein the third gap is defined on the first portion, is connected with the slot, and divides the first portion into a radiating portion and a coupling portion spaced apart from the radiating portion;
a feed portion electrically connected to the radiating portion;
a coupling resistor through which the coupling portion is grounded; and
a signal separation unit electrically connected between the coupling portion and the coupling resistor;

wherein the metallic member comprises a backboard and a side frame, the slot is defined on the backboard or the side frame, the backboard is a rear cover or a battery cover of the wireless communication device;

wherein when the feed portion supplies current, the current flows to the radiating portion and activates a first operation mode to generate radiation signals in a first frequency band;

wherein the current flowing through the radiating portion is further coupled to the coupling portion through the third gap and activates a second operation mode to generate radiation signals in a second frequency band;

wherein when the current flowing through the radiating portion is coupled to the coupling portion through the third gap, radiation signals of the second frequency band enters the signal separation unit, the signal separation unit then separates a GPS signal from the current, and other radiation signals are grounded through the coupling resistor; and wherein the coupling resistor grounds currents of different frequencies thereby a flat coupling amount is maintained.

11. The wireless communication device of claim 10, wherein the slot, the first gap, the second gap, and the third gap are all filled with insulating material.

12. The wireless communication device of claim 10, wherein the metallic member further comprises a side frame, the side frame is positioned around a periphery of the backboard, and wherein the first gap, the second gap, and the third gap are defined on the side frame.

13. The wireless communication device of claim 12, wherein the backboard and the side frame cooperatively form a metallic housing of the wireless communication device.

14. The wireless communication device of claim 12, wherein a first portion of the side frame between the third gap and the first gap forms the radiating portion, and a second portion of the side frame between the third gap and the second gap forms the coupling portion; wherein a frequency of the first frequency band is lower than a frequency of the second frequency band.

15. The wireless communication device of claim 10, wherein the antenna structure further comprises a matching circuit, and the matching circuit comprises a first matching element, a second matching element, a third matching element, and a fourth matching element; and wherein one end of the first matching element feeds the current, another end of the first matching element is electrically connected to one end of the second matching element and one end of the third matching element, another end of the second matching element is grounded, another end of the third matching element is electrically connected to one end of the fourth matching element and the radiating portion, and another end of the fourth matching element is grounded.

16. The wireless communication device of claim 10, wherein the antenna structure further comprises a coupling circuit, and the coupling circuit is electrically connected between the coupling portion and the signal separation unit, the coupling circuit comprises a first coupling element, a second coupling element, a third coupling element, and a fourth coupling element; and wherein one end of the first coupling element is electrically connected to the coupling portion and one end of the second coupling element, another end of the first coupling element is grounded, another end of the second coupling element is electrically connected to one end of the third coupling element and one end of the fourth coupling element, another end of the third coupling element is grounded, and another end of the fourth coupling element is electrically connected to the signal separation unit.

17. The wireless communication device of claim 14, wherein the antenna structure further comprises a switching circuit, and the switching circuit comprises a switching unit and a plurality of switching elements; wherein the switching unit is electrically connected to the radiating portion, the switching elements are connected in parallel to each other, one end of each switching element is electrically connected to the switching unit, and the other end of each switching element is grounded; and wherein through controlling the switching unit to switch, the radiating portion is switched to different switching elements and the first frequency band is adjusted.

18. The wireless communication device of claim 10, wherein the wireless communication device uses the first portion to receive or transmit wireless signals at multiple frequency bands simultaneously through carrier aggregation (CA) technology of Long Term Evolution Advanced (LTE-A).

19. The wireless communication device of claim 18, wherein the wireless communication device uses the radiating portion and the coupling portion to receive or transmit wireless signals at multiple frequency bands simultaneously through the CA technology of LTE-A.

* * * * *